United States Patent Office 3,311,624
Patented Mar. 28, 1967

3,311,624
4-AMINO-PIPERIDINES
Gerhard Ohnacker and Eberhard Woitun, Biberach an der Riss, Germany, assignors to Boehringer Ingelheim G.m.b.H., Ingelheim am Rhine, Germany, a corporation of Germany
No Drawing. Filed Apr. 14, 1964, Ser. No. 359,767
Claims priority, application Germany, Apr. 22, 1963, T 23,868
11 Claims. (Cl. 260—247.1)

This invention relates to novel 4-amino-piperidines and their non-toxic, pharmacologically acceptable acid addition salts, as well as to various methods of preparing such compounds.

More particularly, the present invention relates to 4-amino-piperidines of the formula

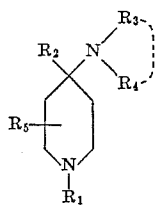

(I)

wherein
$R_1$ is an acyclic hydrocarbon substituent of at least two carbon atoms, phenoxyalkyl or aralkyl,
$R_2$ is an acyclic hydrocarbon, substituted or unsubstituted aryl, aralkyl, or a heteroaryl radical, such as furyl, thienyl or pyrrolyl,
$R_3$ and $R_4$ are identical or different alkyl or aralkyl radicals or, together with the adjacent nitrogen atom, form a heterocyclic ring, and
$R_5$ is hydrogen, lower alkyl, aralkyl or aryl, and their non-toxic, pharmacologically acceptable acid addition salts with inorganic or organic acids.

The compounds according to the present invention may be prepared by a variety of methods which are well known in principle, but the following methods have proved to be most convenient and efficient.

METHOD A

Reaction of a 4 - amino - 4-cyano-piperidine of the formula

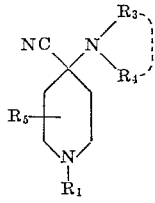

(II)

wherein $R_1$ and $R_3$ through $R_5$ have the same meanings as in Formula I, with an organometallic compound comprising the radical $R_2$ as defined above, and preferably with a Grignard compound of the formula $$R_2-Mg-Hal \quad \quad \quad (III)$$

wherein $R_2$ has the same meanings as in Formula I and Hal is halogen, whereby the cyano group in compound II is replaced by $R_2$.

The reaction is performed under customary conditions, most advantageously in the presence of an anhydrous inert organic solvent, such as ether, benzene, tetrahydrofuran or a mixture of any two or more of these, and at elevated temperatures, most advantageously at the boiling point of the inert solvent.

The reaction product may thereafter readily be isolated in the free base form by admixing the reaction mixture with water, as illustrated in the examples below.

The 4 - amino-4-cyano-piperidines of the Formula II above, which are used as starting materials in this method, may themselves be obtained by reacting a piperidone of the formula

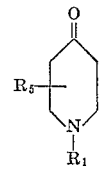

(IV)

wherein $R_1$ and $R_5$ have the same meanings as in Formula I, with an alkali metal cyanide and with a secondary amine of the formula

(V)

wherein $R_3$ and $R_4$ have the same meanings as in Formula I, in the presence of a mineral acid or in the presence of sodium bisulfite in aqueous or aqueous-alcoholic solution. For instance, the following 4-amino-4-cyano-piperidines (II) were prepared in this manner:

(a) 1 - isopropyl - 4 - pyrrolidino - 4 - cyano-piperidine, M.P. 62–63° C.
(b) 1 - isopropyl - 3 - methyl - 4-dimethylamino-4-cyano-piperidine, B.P. 90° C. at 0.6. mm. Hg.
(c) 1-n-butyl - 4 - (methyl-benzyl-amino) - 4-cyano-piperidine, B.P. 187–190° C. at 2 mm. Hg.
(d) 1-n-butyl - 4 - piperidino - 4 - cyano-piperidine, M.P. 44–45° C.
(e) 1-allyl - 4 - morpholino - 4 - cyano-piperidine, M.P. 92–93° C.
(f) 1-benzyl - 4 - morpholino - 4 - cyano-piperidine, M.P. 122–123° C.
(g) 1-($\beta$-phenylethyl) - 4 - dimethylamino-4-cyano-piperidine, M.P. 72–73° C.
(h) 1 - ($\beta$-phenylethyl) - 4 - morpholino - 4-cyano-piperidine, M.P. 119–120° C.
(i) 1 - ($\gamma$-phenylallyl) - 4 - dimethylamine-4-cyano-piperidine, M.P. 106–107° C.

METHOD B

Reaction of an enamine salt of the formula

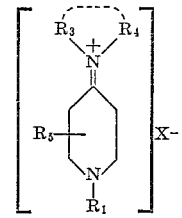

(VI)

wherein $R_1$ and $R_3$ through $R_5$ have the same meanings as in Formula I and $X^-$ is the anion of an inorganic or organic acid, such as p-toluenesulfonic acid, with an organo-metallic compound comprising the substituent $R_2$ as defined above, preferably with a Grignard compound of the Formula III above.

This reaction is performed in customary fashion and most advantageously in the presence of an anhydrous inert organic solvent, such as ether, benzene, tetrahydrofuran or a mixture of any two or more of these, and preferably at room temperature. The reaction product (I) in free base form may be isolated in customary fashion after decomposing the reaction mixture with water.

The enamine salts of the Formula VI, which are used as starting materials in this method, may themselves be prepared by condensation of a piperidone of the Formula IV with an amine of the Formula V, and thereafter reacting the 4-amino-1,2,5,6-tetrahydropyridine thus obtained with an anhydrous acid of the Formula HX, wherein X has the same meanings as in Formula VI.

Thus, for instance, the p-toluene-sulfonic acid salts of 1-benzyl-4-piperidino-1,2,5,6-tetrahydro-pyridine was obtained by condensing 1-benzyl-piperidone-(4) with piperidine, dissolving 18 gm. of the 1-benzyl-4-piperidino-1,2,5,6-tetrahydropyridine (B.P. 150–151° C. at 0.2 mm. Hg) thus obtained in toluene, and admixing the resulting solution with a solution of 28 gm. of p-toluene-sulfonic acid in 150 cc. of toluene which had previously been freed from water by means of a customary water separator.

METHOD C

Alkylation or aralkylation of a 4-amino-piperidine of the formula

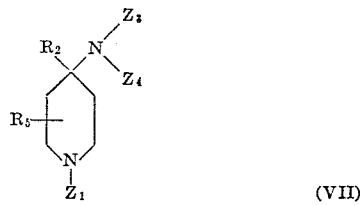

wherein $R_2$ and $R_5$ have the same meanings as in Formula I and at least one of substituents $Z_1$, $Z_3$ and $Z_4$ is hydrogen and the remainder, if any, have the same meanings as $R_1$, $R_3$ and $R_4$ in Formula I, respectively.

The alkylation or aralkylation is effected by customary methods in one or two reaction steps. Depending upon the number of replaceable hydrogen atoms ($Z_1$, $Z_3$ and/or $Z_4$), one, two or three mols or a slight excess of the alkylating or aralkylating agent are used.

The compound of the Formula VII is either reacted with a corresponding halide or sulfate, preferably in an inert organic solvent and optionally in the presence of an inorganic or tertiary organic base as an acid-binding agent to tie up or neutralize the hydrohalic or sulfuric acid liberated by the reaction; or the compound of the Formula VII is reacted first with a corresponding aldehyde or ketone, and the Schiff's base or enamine salt formed thereby, respectively, is then reduced; or a compound of the Formula VII is first reacted with an acylating agent, and the acyl-substituted compound formed thereby is subsequently reduced, for instance, with lithium aluminum hydride.

The 4-amino-piperidines of the Formula VII, which are used as starting materials in this method, may themselves be prepared by Method A or B above from compounds of the Formulas II or VI wherein at least one of $R_1$, $R_3$ and $R_4$ is hydrogen.

The free bases obtained by Methods A, B or C above may be converted into acid addition salts by customary methods, such as dissolving the free base in a suitable inert solvent, adding one or more mol equivalents of the desired acid, and isolating the acid addition salt by precipitation or evaporation.

The following examples further illustrate the present invention and will enable others skilled in the art to understand it more completely. It should be understood, however, that the invention is not limited to the particular examples given below.

EXAMPLE 1

*Preparation of 1-n-butyl-4-phenyl-4-pyrrolidino-piperidine by Method A*

An ethereal solution of the Grignard reagent phenyl-magnesium-bromide was prepared from 11.8 gm. (0.075 mol) of bromo-benzene and 1.8 gm. (0.075 mol) of magnesium shavings in 100 cc. of absolute ether. Thereafter, a solution of 11.7 gm. (0.05 mol) of 1-n-butyl-4-cyano-4-pyrrolidino-piperidine in 100 cc. of absolute ether was added dropwise to the refluxing Grignard solution, accompanied by stirring. After all of the ethereal piperidine solution had been added, the reaction mixture was refluxed for five hours more. The reaction mixture was then allowed to cool and was decomposed with semi-concentrated hydrochloric acid in the presence of ice. The ether phase was separated and discarded. The acidic aqueous phase was made alkaline with ammonia. The oil which separated out was taken up in ether, the resulting solution was dried over sodium sulfate, and the ether was evaporated from the dry solution in vacuo. 3.2 gm. (22% of theory) of an oily substance, B.P. 140–141° C. at 0.3 mm. Hg, were obtained, which was identified to be 1-n-butyl-4-phenyl-4-pyrrolidino-piperidine of the formula

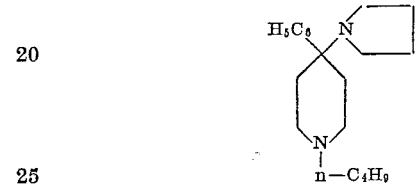

*Analysis.*—$C_{19}H_{30}N_2$; molecular weight 286.47. Calculated: C, 79.67%; H, 10.56%; N, 9.78%. Found: C, 79.75%; H, 10.68%; N, 9.53%.

The dihydrochloride, obtained by acidifying an ethereal solution of the free base with ethereal hydrochloric acid, isolating the precipitate formed thereby and recrystallizing the precipitate from a mixture of ethanol and ether, had a melting point of 255–257° C.

*Analysis.*—$C_{19}H_{32}Cl_2N_2$; molecular weight 359.40. Calculated: 63.50%; H, 8.97%; Cl, 19.73%. Found: C, 63.79%; H, 9.18%; Cl, 19.65%.

EXAMPLE 2

*Preparation of 1-(β-phenylethyl)-4-ethyl-4-morpholino-piperidine by Method A*

A solution of the Grignard reagent ethyl-magnesium-bromide was prepared from 28.4 gm. (0.26 mol) of ethyl bromide and 6.4 gm. (0.26 mol) of magnesium powder in 100 cc. of absolute tetrahydrofuran. Thereafter, 15.0 gm. (0.05 mol) of 1-(β-phenylethyl)-4-cyano-4-morpholino-piperidine, dissolved in 100 cc. of absolute benzene, were added to the Grignard solution at room temperature accompanied by stirring. The reaction solution thus obtained was then refluxed for six hours, allowed to cool, and decomposed with 100 cc. of semi-concentrated hydrochloric acid while cooling with ice. The organic phase was separated and discarded. The aqueous phase was heated for one hour on a boiling water bath, cooled and made alkaline with ammonia. The alkaline solution was extracted three times with 50 cc. portions of chloroform, the extract solutions were combined, and the combined solution was dried over sodium sulfate. The chloroform was evaporated in vacuo, leaving an oil which crystallized upon scratching in the cold. The crystalline mass was recrystallized from a small amount of acetone, yielding 7.4 gm. (49% of theory) of 1-(β-phenylethyl)-4-ethyl-4-morpholino-piperidine, M.P. 66–67° C., of the formula

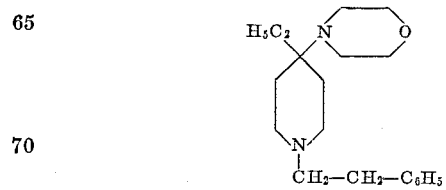

*Analysis.*—$C_{19}H_{30}N_2O$; molecular weight 302.47. Calculated: C, 75.44%; H, 10.00%; N, 9.27%. Found: C, 75.28%; H, 10.11%; N, 9.15%.

EXAMPLE 3

*Preparation of 1-benzyl-4-phenyl-4-piperidino-piperidine by Method B*

A Grignard reagent solution, prepared from 4.8 gm. of magnesium powder, 32 gm. of bromo-benzene and 200 cc. of absolute ether, was added dropwise at a rapid rate to a solution of 46 gm. of 1-benzyl-4-piperidino-1,2,5,6-tetrahydropyridine-p-toluene-sulfonate in 150 cc. of absolute toluene, and the resulting mixture was stirred for twelve hours at room temperature. The reaction mixture was thereafter decomposed on ice water, acidified with 2N hydrochloric acid, and the organic phase was separated and discarded. The aqueous phase was admixed with ammonium chloride, made alkaline with ammonia, and the oil precipitated thereby was taken up in ether. The ether extract solution was dried over sodium sulfate and was then fractionally distilled in vacuo. The oily fraction passing over between 206–208° C. at 0.4 mm. Hg crystallized upon cooling and had a melting point of 77–78° C. It was identified to be 1-benzyl-4-phenyl-4-piperidino-piperidine of the formula

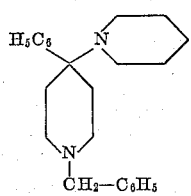

The yield was 12 gm.

Its dihydrochloride, after recrystallization from a mixture of acetone and ethylacetate, had a melting point at 216–217° C.

EXAMPLE 4

*Preparation of 1-(β-phenylethyl)-4-phenyl-4-morpholino-piperidine by Method A*

An ethereal solution of bromoethyl-magnesium bromide, prepared from 14.0 gm. (0.075 mol) of 1,2-dibromo-ethane and 1.9 gm. (0.078 gram atoms) of magnesium powder in 40 cc. of absolute ether, was added dropwise to an ethereal solution of phenyllithium, prepared from 1.2 gm. (0.173 mol) of pulverized lithium and 11.8 gm. (0.075 mol) of bromobenzene in 75 cc. of absolute ether, while passing oxygen-free nitrogen through the phenyllithium solution. The resulting mixture was refluxed for one hour, then was added slowly while stirring a solution of 15.0 gm. (0.05 mol) of 1-(β-phenylethyl)-4-morpholino-4-cyano-piperidine in 50 cc. of absolute benzene. The reaction mixture is subsequently boiled for four hours. Thereafter, the reaction mixture was allowed to cool and 100 cc. of semi-concentrated hydrochloric acid were added, whereby the hydrochloride of 1-(β-phenylethyl)-4-phenyl-4-morpholino-piperidine precipitated.

The reaction mixture was then made alkaline with concentrated ammonia. 6.0 gm. (34% of theory) of the free base of the formula

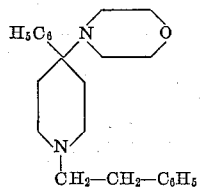

were obtained; it had a melting point of 169–170° C.

*Analysis.*—$C_{23}H_{30}N_2O$; molecular weight 350.51. Calculated: C, 78.81%; H, 8.63%; N, 7.99%. Found: C, 78.85%; H, 8.59%; N, 8.08%.

EXAMPLE 5

Using a procedure analogous to that described in Example 2, 1 - ethyl-4-phenyl-4-dimethylamino-piperidine, B.P. 110–112° C. at 0.2 mm. Hg, of the formula

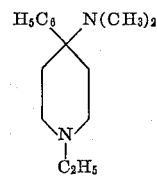

was prepared from 1-ethyl-4-dimethylamino-4-cyano-piperidine and phenyl-magnesium-bromide. The hydrochloride had a melting point of 244° C.

EXAMPLE 6

Using a procedure analogous to that described in Example 2, 1-ethyl-4-phenyl-4-(methyl-benzylamino-piperidine, B.P. 181–183° C. at 0.3 mm. Hg, of the formula

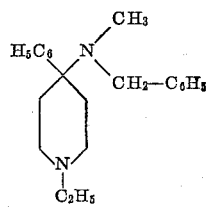

was prepared from 1-ethyl-4-(methyl-benzylamino)-4-cyano-piperidine and phenyl-magnesium-bromide.

EXAMPLE 7

Using a procedure analogous to that described in Example 2, 1-ethyl-4-benzyl-4-dimethylamino-piperidine was prepared from 1-ethyl-4-dimethylamino-4-cyano-piperidine and benzyl-magnesium-bromide. The hydrochloride had a melting point of 215° C.

EXAMPLE 8

Using a procedure analogous to that described in Example 2, 1-n-propyl-4-phenyl-4-dimethylamino-piperidine, B.P. 112–114° C. at 0.1 mm. Hg, was prepared from 1-n-propyl-4-dimethylamino-4-cyano-piperidine and phenyl-magnesium-bromide. The hydrochloride had a melting point of 249–250° C.

EXAMPLE 9

Using a procedure analogous to that described in Example 2, 1-n-propyl-4-benzyl-4-dimethylamino-piperidine, B.P. 138–139° C. at 0.5 mm. Hg, was prepared from 1-n-propyl-4-dimethylamino-4-cyano-piperidine and benzyl-magnesium-bromide.

EXAMPLE 10

Using a procedure analogous to that described in Example 2, 1-isopropyl-4-ethyl-4-morpholino-piperidine, B.P. 83–84° C. at 0.02 mm. Hg, of the formula

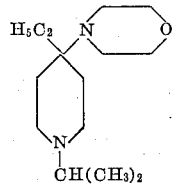

was prepared from 1-isopropyl-4-morpholino-4-cyano-piperidine and ethyl-magnesium-bromide. The hydrochloride had a melting point of 265–266° C.

EXAMPLE 11

Using a procedure analogous to that described in Example 2, 1-isopropyl-4-ethyl-4-piperidino-piperidine, B.P. 82° C. at 0.02 mm. Hg, was prepared from 1-isopropyl-4-piperidino-4-cyano-piperidine and ethyl-magnesium-bromide. The hydrochloride had a melting point of 274–275° C.

EXAMPLE 12

Using a procedure analogous to that described in Example 2, 1-isopropyl-4-ethyl-4-pyrrolidino-piperidine, B.P. 82–83° C. at 0.13 mm. Hg, was prepared from 1-isopropyl-4-pyrrolidino-4-cyano-piperidine and ethyl-magnesium-bromide. The hydrochloride had a melting point of 275–276° C.

EXAMPLE 13

Using a procedure analogous to that described in Example 2, 1-isopropyl-4-n-propyl-4-piperidino-piperidine, B.P. 92–93° C. at 0.07 mm. Hg, of the formula

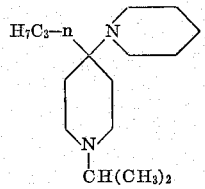

was prepared from 1-isopropyl-4-piperidino-4-cyano-piperidine and n-propyl-magnesium-bromide. The hydrochloride had a melting point of 231–232° C.

EXAMPLE 14

Using a procedure analogous to that described in Example 2, 1-isopropyl-4-n-propyl-4-pyrrolidino-piperidine, B.P. 73–75° C. at 0.04 mm. Hg, of the formula

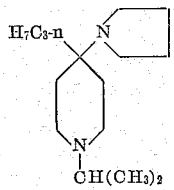

was prepared from 1-isopropyl-4-pyrrolidino-4-cyano-piperidine and n-propyl-magnesium-bromide. The hydrochloride had a melting point of 259–261° C.

EXAMPLE 15

Using a procedure analogous to that described in Example 2, 1,4-diisopropyl-4-morpholino-piperidine, B.P. 93° C. at 0.03 mm. Hg, was prepared from 1-isopropyl-4-morpholino-4-cyano-piperidine and isopropyl-magnesium-bromide.

EXAMPLE 16

Using a procedure analogous to that described in Example 2, 1-isopropyl-4-n-butyl-4-morpholino-piperidine, B.P. 122–123° C. at 0.23 mm. Hg, was prepared from 1-isopropyl-4-morpholino-4-cyano-piperidine and n-butyl-magnesium-bromide. The hydrochloride had a melting point of 135–136° C.

EXAMPLE 17

Using a procedure analogous to that described in Example 2, 1-isopropyl-4-n-butyl-4-piperidino-piperidine, B.P. 114–115° C. at 0.16 mm. Hg, was prepared from 1-isopropyl-4-piperidino-4-cyano-piperidine and n-butyl-magnesium-bromide. The hydrochloride had a melting point of 231–234° C.

EXAMPLE 18

Using a procedure analogous to that described in Example 2, 1-isopropyl-4-n-butyl-4-pyrrolidino-piperidine, B.P. 97–99° C. at 0.04 mm. Hg, was prepared from 1-isopropyl-4-pyrrolidino-4-cyano-piperidine and n-butyl-magnesium-bromide. The hydrochloride had a melting point of 216–219° C.

EXAMPLE 19

Using a procedure analogous to that described in Example 2, 1-isopropyl-4-n-hexyl-4-piperidino-piperidine, B.P. 132–134° C. at 0.23 mm. Hg, was prepared from 1-isopropyl-4-piperidino-4-cyano-piperidine and n-hexyl-magnesium-bromide. The hydrochloride had a melting point of 224–225° C.

EXAMPLE 20

Using a procedure analogous to that described in Example 2, 1-isopropyl-4-n-hexyl-4-pyrrolidino-piperidine, B.P. 105–106° C. at 0.03 mm. Hg, was prepared from 1-isopropyl-4-pyrrolidino-4-cyano-piperidine and n-hexyl-magnesium-bromide. The hydrochloride had a melting point of 209–211° C.

EXAMPLE 21

Using a procedure analogous to that described in Example 2, 1-isopropyl-4-n-heptyl-4-morpholino-piperidine, B.P. 129–130° C. at 0.03 mm. Hg, was prepared from 1-isopropyl-4-morpholino-4-cyano-piperidine and n-heptyl-magnesium-bromide.

EXAMPLE 22

Using a procedure analogous to that described in Example 2, 1-isopropyl-4-n-octyl-4-piperidino-piperidine, B.P. 149–151° C. at 0.18 mm. Hg, was prepared from 1-isopropyl-4-piperidino-4-cyano-piperidine and n-octyl-magnesium-bromide. The hydrochloride had a melting point of 156–158° C.

EXAMPLE 23

Using a procedure analogous to that described in Example 2, 1-isopropyl-4-n-octyl-4-pyrrolidino-piperidine, B.P. 129–130° C. at 0.07 mm. Hg, was prepared from 1-isopropyl-4-pyrrolidino-4-cyano-piperidine and n-octyl-magnesium-bromide.

EXAMPLE 24

Using a procedure analogous to that described in Example 2, 1-isopropyl-4-n-decyl-4-morpholino-piperidine, B.P. 161–163° C. at 0.07 mm. Hg, was prepared from 1-isopropyl-4-morpholino-4-cyano-piperidine and n-decyl-magnesium-bromide.

EXAMPLE 25

Using a procedure analogous to that described in Example 2, 1-isopropyl-4-n-dodecyl-4-dimethylamino-piperidine, B.P. 185–187° C. at 0.5 mm. Hg, was prepared from 1-isopropyl-4-dimethylamino-4-cyano-piperidine and n-dodecyl-magnesium-bromide.

EXAMPLE 26

Using a procedure analogous to that described in Example 2, 1-isopropyl-4-n-dodecyl-4-morpholino-piperidine, B.P. 186–189° C. at 0.09 mm. Hg, of the formula

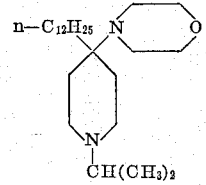

was prepared from 1-isopropyl-4-morpholino-4-cyano-piperidine and n-dodecyl-magnesium-bromide.

EXAMPLE 27

Using a procedure analogous to that described in Example 2, 1-isopropyl-4-n-dodecyl-4-piperidino-piperidine, B.P. 167–169° C. at 0.04 mm. Hg, was prepared from 1-isopropyl-4-piperidino-4-cyano-piperidine and n-dodecyl-magnesium-bromide.

EXAMPLE 28

Using a procedure analogous to that described in Example 2, 1-isopropyl-4-n-dodecyl-4-pyrrolidino-piperidine, B.P. 173–174° C. at 0.17 mm. Hg, was prepared from 1-isopropyl-4-pyrrolidino-4-cyano-piperidine and n-dodecyl-magnesium-bromide.

EXAMPLE 29

Using a procedure analogous to that described in Example 2, 1-isopropyl-4-phenyl-4-dimethylamino-piperidine, B.P. 110–115° C. at 0.2 mm. Hg, was prepared from 1-isopropyl-4-dimethylamino-4-cyano-piperidine and phenyl-magnesium-bromide. The hydrochloride had a melting point of 246–247° C.

EXAMPLE 30

Using a procedure analogous to that described in Example 2, 1-isopropyl-4-phenyl-4-(methylbenzylamino)-piperidine. B.P. 177–180° C. at 0.2 mm. Hg, was prepared from 1-isopropyl-4-(methyl-benzyl-amino)-4-cyano-piperidine and phenyl-magnesium-bromide. The hydrochloride had a melting point of 182–184° C.

EXAMPLE 31

Using a procedure analogous to that described in Example 2, 1-isopropyl-4-phenyl-4-morpholino-piperidine, M.P. 97–98° C., was prepared from 1-isopropyl-4-morpholino-4-cyano-piperidine and phenyl-magnesium-bromide.

EXAMPLE 32

Using a procedure analogous to that described in Example 2, 1-isopropyl-4-phenyl-4-piperidino-piperidine, M.P. 68° C., was prepared from 1-isopropyl-4-piperidino-4-cyano-piperidine and phenyl-magnesium bromide.

EXAMPLE 33

Using a procedure analogous to that described in Example 2, 1-isopropyl-4-phenyl-4-pyrrolidino-piperidine, M.P. 53–54° C., was prepared from 1-isopropyl-4-pyrrolidino-4-cyano-piperidine and phenyl-magnesium-bromide.

EXAMPLE 34

Using a procedure analogous to that described in Example 2, 1 - isopropyl-4-benzyl-4-dimethylamino-piperidine, B.P. 133–134° C. at 0.4 mm. Hg, was prepared from 1-isopropyl-4-dimethylamino-4-cyano-piperidine and benzyl-magnesium-bromide. The hydrochloride had a melting point of 254° C.

EXAMPLE 35

Using a procedure analogous to that described in Example 2, 1 - isopropyl-4-benzyl-4-(methyl-benzylamino)-piperidine, M.P. 104–105° C., was prepared from 1-isopropyl - 4-(methyl-benzyl-amino)-4-cyano-piperidine and benzyl-magnesium-bromide.

EXAMPLE 36

Using a procedure analogous to that described in Example 2, 1 - isopropyl-4-benzyl-4-morpholino-piperidine, M.P. 91–92° C., was prepared from 1-isopropyl-4-morpholino-4-cyano-piperidine and benzyl-magnesium-bromide.

EXAMPLE 37

Using a procedure analogous to that described in Example 2, 1 - isopropyl-3-methyl-4-phenyl-4-dimethylamino-piperidine, M.P. 82–83° C., of the formula

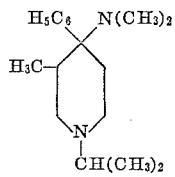

was prepared from 1-isopropyl-3-methyl-4-dimethylamino-4-cyano-piperidine and phenyl-magnesium-bromide.

EXAMPLE 38

Using a procedure analogous to that described in Example 1, 1-n-butyl-4-ethyl-4-piperidino-piperidine, B.P. 115–117° C. at 0.3 mm. Hg, was prepared from 1-n-butyl-4-piperidino-4-cyano-piperidine and ethyl-magnesium-bromide. The hydrochloride had a melting point of 250–251° C.

EXAMPLE 39

Using a procedure analogous to that described in Example 2, 1-n-butyl-4-ethyl-4-pyrrolidino-piperidine, B.P. 90–91° C. at 0.13 mm. Hg, was prepared from 1-n-butyl-4 - pyrrolidino-4-cyano-piperidine and ethyl-magnesium-bromide. The hydrochloride had a melting point of 270–272° C.

EXAMPLE 40

Using a procedure analogous to that described in Example 2, 1-n-butyl-4-allyl-4-piperidino-piperidine, B.P. 130° C. at 0.02 mm. Hg, of the formula

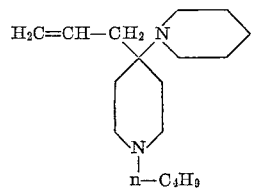

was prepared from 1-n-butyl-4-piperidino-4-cyano-piperidine and allyl-magnesium-bromide. The hydrochloride had a melting point of 197° C.

EXAMPLE 41

Using a procedure analogous to that described in Example 1, 1,4-di-n-butyl-4-pyrrolidino-piperidine, B.P. 106–108° C. at 0.06 mm. Hg, was prepared from 1-n-butyl-4-pyrrolidino-4-cyano-piperidine and n-butyl-magnesium-bromide. The hydrochloride had a melting point of 211–213° C.

EXAMPLE 42

Using a procedure analogous to that described in Example 2, 1-n-butyl-4-(2'-thienyl)-4-piperidino-piperidine, B.P. 168–169° C. at 0.6 mm. Hg, of the formula

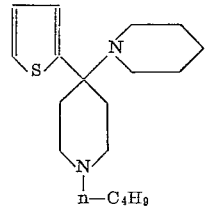

was prepared from 1-n-butyl-4-piperidino-4-cyano-piperidine and 2-thienyl-magnesium-bromide. The hydrochloride had a melting point of 191–193° C.

EXAMPLE 43

Using a procedure analogous to that described in Example 2, 1-n-butyl-4-phenyl-4-dimethylamino-piperidine, B.P. 147° C. at 0.3 mm. Hg, was prepared from 1-n-butyl-4-dimethylamino - 4-cyano-piperidine and phenyl-magnesium-bromide. The hydrochloride had a melting point of 232–233° C.

EXAMPLE 44

Using a procedure analogous to that described in Example 2, 1-n-butyl-4-phenyl-4-(methyl-benzylamino)-piperidine, B.P. 165–168° C. at 0.6 mm. Hg, was prepared from 1 - n-butyl-4-(methyl-benzylamino)-4-cyano-piperidine and phenyl-magnesium-bromide.

EXAMPLE 45

Using a procedure analogous to that described in Example 1, 1-n-butyl-4-phenyl-4-piperidino-piperidine, B.P. 151–153° C. at 0.2 mm. Hg, was prepared from 1-n-butyl-4-piperidino-4-cyano-piperidine and phenyl-magnesium-

EXAMPLE 46

Using a procedure analogous to that described in Example 2, 1-n-butyl-4-benzyl-4-dimethylamino-piperidine, B.P. 154–155° C. at 0.5 mm. Hg, was prepared from 1-n-butyl - 4-dimethylamino-4-cyano-piperidine and benzyl-magnesium-bromide. The hydrochloride had a melting point of 247–248° C.

EXAMPLE 47

Using a procedure analogous to that described in Example 2, 1-n-butyl-4-benzyl-4-(methyl-benzylamino)-piperidine, B.P. 126-128° C. at 0.6 mm. Hg, was prepared from 1 - n-butyl-4-(methyl-benzylamino)-4-cyano-piperidine and benzyl-magnesium-bromide.

EXAMPLE 48

Using a procedure analogous to that described in Example 1, 1-n-butyl-4-benzyl-4-piperidino-piperidine, B.P. 163–170° C. at 0.25 mm. Hg, was prepared from 1-n-butyl-4-piperidino-4-cyano-piperidine and benzyl-magnesium-bromide. The hydrochloride had a melting point of 227–230° C.

EXAMPLE 49

Using a procedure analogous to that described in Example 1, 1-n-butyl-4-benzyl-4-pyrrolidino-piperidine, B.P. 155–156° C. at 0.3 mm. Hg, was prepared from 1-n-butyl-4-pyrrolidino-4-cyano-piperidine and benzyl-magnesium-bromide. The hydrochloride had a melting point of 178–180° C.

EXAMPLE 50

Using a procedure analogous to that described in Example 2, 1-n-butyl-4-(p-methylbenzyl)-4-dimethylamino-piperidine, B.P. 158° C. at 0.3 mm. Hg, of the formula

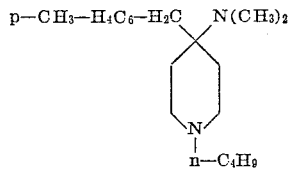

was prepared from 1-n-butyl-4-dimethylamino-4-cyano-piperidine and p-methylbenzyl-magnesium-bromide. The hydrochloride had a melting point of 237–238° C.

EXAMPLE 51

Using a procedure analogous to that described in Example 2, 1-n-butyl-4-(β-phenylethyl)-4-dimethylamino-piperidin, B.P. 110–114° C. at 1 mm. Hg, of the formula

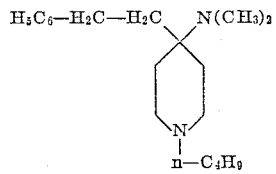

was prepared from 1-n-butyl-4-dimethylamino-4-cyano-piperidine and β-phenylethyl-magnesium-bromide.

EXAMPLE 52

Using a procedure analogous to that described in Example 2, 1-(γ,γ-dimethyl-n-propyl)-4-n-dodecyl-4-piperidino-piperidine, B.P. 177–179° C. at 0.03 mm. Hg, of the formula

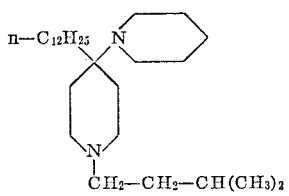

was prepared from 1-(γ,γ-dimethyl-n-propyl)-4-piperidino-4-cyano-piperidine and n-dodecyl - magnesium - bromide.

EXAMPLE 53

Using a procedure analogous to that described in Example 2, 1-n-hexyl-4-ethyl-4-piperindo-piperidine, B.P. 118° C. at 0.05 mm. Hg, of the formula

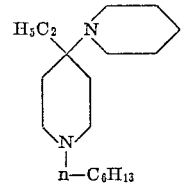

was prepared from 1-n-hexyl-4-piperindo-4-cyano-piperidine and ethyl-magnesium-bromide.

EXAMPLE 54

Using a procedure analogous to that described in Example 2, 1-n-hexyl-4-phenyl-4-piperindo-piperidine, M.P. 39–40° C., was prepared from 1-n-hexyl-4-piperindo-4-cyano-piperidine and phenyl-magnesium-bromide.

EXAMPLE 55

Using a procedure analogous to that described in Example 2, 1-allyl-4-ethyl-4-morpholino-piperidine, B.P. 86° C. at 0.02 mm. Hg, of the formula

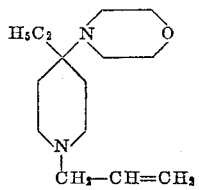

was prepared from 1-allyl-4-morpholino-4-cyano-piperidine and ethyl-magnesium-bromide.

EXAMPLE 56

Using a procedure analogous to that described in Example 2, 1-allyl-4-n-butyl-4-morpholino-piperidine, B.P. 132° C. at 0.26 mm. Hg, was prepared from 1-allyl-4-morpholino-4-cyano-piperidine and n-butyl-magnesium-bromide.

EXAMPLE 57

Using a procedure analogous to that described in Example 2, 1-allyl-4-n-hexyl-4-morpholino-piperidine, B.P. 151–152° C. at 0.47 mm. Hg, was prepared from 1-allyl-4-morpholino-4-cyano-piperidine and n-hexyl-magnesium-bromide.

EXAMPLE 58

Using a procedure analogous to that described in Example 2, 1-allyl-4-n-heptyl-4-morpholino-piperidine, B.P. 145° C. at 0.07 mm. Hg, was prepared from 1-allyl-4-morpholino-4-cyano-piperidine and n-heptyl-magnesium-bromide.

EXAMPLE 59

Using a procedure analogous to that described in Example 2, 1-benzyl-4-ethyl-4-pyrrolidino-piperidine, B.P. 126–129° C. at 0.04 mm. Hg, of the formula

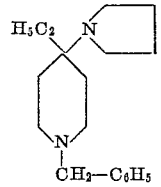

was prepared from 1-benzyl-4-pyrrolidino-4-cyano-piperidine and ethyl-magnesium-bromide. The hydrochloride had a melting point of 242–244° C.

EXAMPLE 60

Using a procedure analogous to that described in Example 2, 1-benzyl-4-n-propyl-4-morpholino-piperidine, B.P. 151° C. at 0.1 mm. Hg, was prepared from 1-benzyl-4-morpholino-4-cyano-piperidine and n-propyl-magnesium-bromide.

EXAMPLE 61

Using a procedure analogous to that described in Example 2, 1-benzyl-4-n-propyl-4-piperidino-piperidine, B.P. 144–145° C. at 0.06 mm. Hg, was prepared from 1-benzyl-4-piperidino-4-cyano-piperidine and n-propyl-magnesium-bromide. The hydrochloride has a melting point of 259–261° C.

EXAMPLE 62

Using a procedure analogous to that described in Example 2, 1-benzyl-4-n-propyl-4-pyrrolidino-piperidine, B.P. 134–136° C. at 0.05 mm. Hg, was prepared from 1-benzyl-4-pyrrolidino-4-cyano-piperidine and n-propyl-magnesium-bromide. The hydrochloride had a melting point of 288–289° C.

EXAMPLE 63

Using a procedure analogous to that described in Example 2, 1-benzyl-4-n-butyl-4-morpholino-piperidine, B.P. 161–163° C. at 0.02 mm. Hg, was prepared from 1-benzyl-4-morpholino-4-cyano-piperidine and n-butyl-magnesium-bromide. The hydrochloride had a melting point of 240–242° C.

EXAMPLE 64

Using a procedure analogous to that described in Example 2, 1-benzyl-4-n-butyl-4-piperidino-piperidine, B.P. 160–163° C. at 0.1 mm. Hg, was prepared from 1-benzyl-4-piperidino-4-cyano-piperidine and n-butyl-magnesium-bromide. The hydrochloride had a melting point of 240–241° C.

EXAMPLE 65

Using a procedure analogous to that described in Example 2, 1-benzyl-4-n-butyl-4-pyrrolidino-piperidine, B.P. 146–148° C. at 0.07 mm. Hg, was prepared from 1-benzyl-4-pyrrolidino-4-cyano-piperidine and n-butyl-magnesium-bromide. The hydrochloride hade a melting point of 236–238° C.

EXAMPLE 66

Using a procedure analogous to that described in Example 2, 1-benzyl-4-n-hexyl-4-pyrrolidino-piperidine, B.P. 175–177° C. at 0.25 mm. Hg, was prepared from 1-benzyl-4-pyrrolidino-4-cyano-piperidine and n-hexyl-magnesium-bromide. The hydrochloride had a melting point of 248–250° C.

EXAMPLE 67

Using a procedure analogous to that described in Example 2, 1-benzyl-4-n-octyl-4-piperidino-piperidine, B.P. 177–178° C. at 0.02 mm. Hg, was prepared from 1-benzyl-4-piperidino-4-cyano-piperidine and n-octyl-magnesium-bromide. The hydrochloride had a melting point of 130–132° C.

EXAMPLE 68

Using a procedure analogous to that described in Example 2, 1-benzyl-4-n-octyl-4-pyrrolidino-piperidine, B.P. 180–183° C. at 0.09 mm. Hg, was prepared from 1-benzyl-4-pyrrolidino-4-cyano-piperidine and n-octyl-magnesium-bromide. The hydrochloride had a melting point of 242–244° C.

EXAMPLE 69

Using a procedure analogous to that described in Example 2, 1-benzyl-4-n-nonyl-4-dimethylamino-piperidine was prepared from 1-benzyl-4-dimethylamino-4-cyano-piperidine and n-nonyl-magnesium-bromide. The hydrochloride had a melting point of 178–179° C.

EXAMPLE 70

Using a procedure analogous to that described in Example 2, 1-benzyl-4-n-dodecyl-4-piperidino-piperidine, B.P. 205–208° C. at 0.04 mm. Hg, was prepared from 1-benzyl-4-piperidino-4-cyano-piperidine and n-dodecyl-magnesium-bromide.

EXAMPLE 71

Using a procedure analogous to that described in Example 2, 1-benzyl-4-phenyl-4-dimethylamino-piperidine, B.P. 165° C. at 0.2 mm. Hg, was prepared from 1-benzyl-4-dimethylamino-4-cyano-piperidine and phenyl-magnesium-bromide. The hydrochloride had a melting point of 232–234° C.

EXAMPLE 72

Using a procedure analogous to that described in Example 2, 1-benzyl-4-phenyl-4-morpholino-piperidine, M.P. 134–135° C., was prepared from 1-benzyl-4-morpholino-4-cyano-piperidine and phenyl-magnesium-bromide.

EXAMPLE 73

Using a procedure analogous to that described in Example 2, 1-benzyl-4-phenyl-4-pyrrolidino-piperidine, M.P. 102–103° C., was prepared from 1-benzyl-4-pyrrolidino-4-cyano-piperidine and phenyl-magnesium-bromide.

EXAMPLE 74

Using a procedure analogous to that described in Example 2, 1-benzyl-4-(p-chloro-phenyl)-4-dimethylamino-piperidine, B.P. 188–192° C. at 0.4 mm. Hg, of the formula

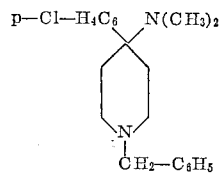

was prepared from 1-benzyl-4-dimethylamino-4-cyano-piperidine and p-chlorophenyl-magnesium-bromide. The hydrochloride had a melting point of 250–252° C.

EXAMPLE 75

Using a procedure analogous to that described in Example 2, 1,4-dibenzyl-4-morpholino-piperidine, M.P. 86–87° C., was prepared from 1-benzyl-4-morpholino-4-cyano-piperidine and benzyl-magnesium-bromide.

EXAMPLE 76

Using a procedure analogous to that described in Example 2, 1,4-dibenzyl-4-piperidino-piperidine, M.P. 96–97° C., was prepared from 1-benzyl-4-piperidino-4-cyano-piperidine and benzyl-magnesium-bromide.

EXAMPLE 77

Using a procedure analogous to that described in Example 2, 1,4-dibenzyl-4-pyrrolidino-piperidine, M.P. 101–102° C., was prepared from 1-benzyl-4-pyrrolidino-4-cyano-piperidine and benzyl-magnesium-bromide.

EXAMPLE 78

Using a procedure analogous to that described in Example 2, 1-($\beta$-phenyl-ethyl)-4-ethyl-4-pyrrolidino-piperidine, B.P. 130° C. at 0.02 mm. Hg, was prepared from 1-($\beta$-phenyl-ethyl)-4-pyrrolidino-4-cyano-piperidine and ethyl-magnesium-bromide.

EXAMPLE 79

Using a procedure analogous to that described in Example 2, 1-(β-phenyl-ethyl)-4-ethyl-4-(N'-methyl-piperazino)-piperidine, M.P. 57–58° C., of the formula

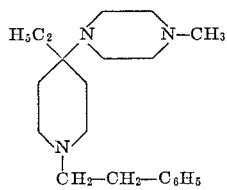

was prepared from 1-(β-phenyl-ethyl)-4-(N'-methyl-piperazino)-4-cyano-piperidine and ethyl-magnesium-bromide.

EXAMPLE 80

Using a procedure analogous to that described in Example 2, 1-(β-phenyl-ethyl)-4-n-propyl-4-morpholino-piperidine, M.P. 64–65° C., was prepared from 1-(β-phenyl-ethyl) - 4 - morpholino - 4 - cyano - piperidine and n-propyl-magnesium-bromide.

EXAMPLE 81

Using a procedure analogous to that described in Example 2, 1-(β-phenyl-ethyl)-4-n-butyl-4-morpholino-piperidine, M.P. 51–52° C., was prepared from 1-(β-phenyl-ethyl)-4-morpholino-4-cyano-piperidine and n-butyl-magnesium-bromide.

EXAMPLE 82

Using a procedure analogous to that described in Example 2, 1-(β-phenyl-ethyl)-4-n-amyl-4-morpholino-piperidine, M.P. 57–58° C., was prepared from 1-(β-phenyl-ethyl)-4-morpholino-4-cyano-piperidine and n-amyl-magnesium-bromide.

EXAMPLE 83

Using a procedure analogous to that described in Example 2, 1-(β-phenyl-ethyl)-4-n-hexyl-4-morpholino-piperidine, M.P. 46–47° C., was prepared from 1-(β-phenyl-ethyl)-4-morpholino-4-cyano-piperidine and n-hexyl-magnesium-bromide.

EXAMPLE 84

Using a procedure analogous to that described in Example 2, 1-(β-phenyl-ethyl)-4-n-hexyl-4-pyrrolidino-piperidine, B.P. 166–167° C. at 0.04 mm. Hg, was prepared from 1-(β-phenyl-ethyl)-4-pyrrolidino-4-cyano-piperidine and n-hexyl-magnesium-bromide.

EXAMPLE 85

Using a procedure analogous to that described in Example 2, 1-(β-phenyl-ethyl)-4-n-heptyl-4-morpholino-piperidine, M.P. 93–40° C., was prepared from 1-(β-phenyl-ethyl) - 4 - morpholino - 4 - cyano - piperidine and n-heptyl-magnesium-bromide.

EXAMPLE 86

Using a procedure analogous to that described in Example 2, 1-(β-phenyl-ethyl)-4-n-octyl-4-morpholino-piperidine, M.P. 38–40° C., was prepared from 1-(β-phenyl-ethyl)-4-morpholino-4-cyano-piperidine and n-octyl-magnesium-bromide.

EXAMPLE 87

Using a procedure analogous to that described in Example 2, 1-(β-phenyl-ethyl)-4-n-octyl-4-pyrrolidino-piperidine, B.P. 201–202° C. at 0.17 mm. Hg, was prepared from 1-(β-phenyl-ethyl)-4-pyrrolidino-4-cyano-piperidine and n-octyl-magnesium-bromide.

EXAMPLE 88

Using a procedure analogous to that described in Example 2, 1-(β-phenyl-ethyl)-4-n-decyl-4-morpholino-piperidine, B.P. 205–207° C. at 0.04 mm. Hg, M.P. 42–43° C., was prepared from 1-(β-phenyl-ethyl)-4-morpholino-4-cyano-piperidine and n-decyl-magnesium-bromide.

EXAMPLE 89

Using a procedure analogous to that described in Example 2, 1-(β-phenyl-ethyl)-4-n-dodecyl-4-morpholino-piperidine, M.P. 39–40° C., was prepared from 1-(β-phenyl-ethyl)-4-morpholino-4-cyano-piperidine and n-dodecyl-magnesium-bromide.

EXAMPLE 90

Using a procedure analogous to that described in Example 2, 1-(β-phenyl-ethyl)-4-n-dodecyl-4-piperidino-piperidine, B.P. 177–179° C. at 0.03 mm. Hg, was prepared from 1-(β-phenyl-ethyl)-4-piperidino-4-cyano-piperidine and n-dodecyl-magnesium-bromide.

EXAMPLE 91

Using a procedure analogous to that described in Example 2, 1-(β-phenyl-ethyl)-4-phenyl-4-dimethylamino-piperidine, M.P. 84–86° C., was prepared from 1-(β-phenyl-ethyl)-4-dimethylamino-4-cyano-piperidine and phenyl-magnesium-bromide. The hydrochloride had a melting point of 256–258° C.

EXAMPLE 92

Using a procedure analogous to that described in Example 2, 1-(β-phenyl-ethyl)-4-phenyl-4-piperidino-piperidine, M.P. 114° C., was prepared from 1-(β-phenyl-ethyl)-4-piperidino-4-cyano-piperidine and phenyl-magnesium-bromide.

EXAMPLE 93

Using a procedure analogous to that described in Example 2, 1-(β-phenyl-ethyl)-4-phenyl-4-pyrrolidino-piperidine, M.P. 108° C., was prepared from 1-(β-phenyl-ethyl)-4-pyrrolidino-4-cyano-piperidine and phenyl-magnesium-bromide.

EXAMPLE 94

Using a procedure analogous to that described in Example 2, 1-(β-phenyl-ethyl)-4-benzyl-4-morpholino-piperidine, M.P. 122–123° C., was prepared from 1-(β-phenyl-ethyl)-4-morpholino-4-cyano-piperidine and benzyl-magnesium-bromide.

EXAMPLE 95

Using a procedure analogous to that described in Example 2, 1,4-di-(β-phenyl-ethyl)-4-morpholino-piperidine, M.P. 90–91° C., was prepared from 1-(β-phenyl-ethyl)-4-morpholino - 4 - cyano-piperidine and β-phenyl-ethyl-magnesium-bromide.

EXAMPLE 96

Using a procedure analogous to that described in Example 2, 1-(β-phenyl-ethyl)-4-(γ-phenyl-n-propyl)-4-morpholino-piperidine, M.P. 48–49° C., of the formula

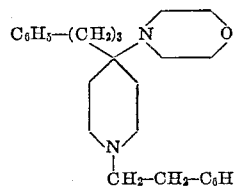

was prepared from 1-(β-phenyl-ethyl)-4-morpholino-4-cyano-piperidine and (γ - phenyl - n - propyl)-magnesium-bromide.

EXAMPLE 97

Using a procedure analogous to that described in Example 2, 1-(α-phenyl-ethyl)-4-n-octyl-4-piperidino-piperidine, B.P. 199–202° C. at 0.1 mm. Hg, of the formula

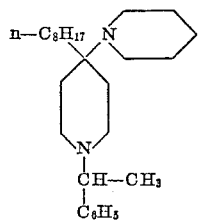

was prepared from 1-(α-phenyl-ethyl)-4-piperidino-4-cyano-piperidine and n-octyl-magnesium-bromide. The hydrochloride had a melting point of 111° C.

EXAMPLE 98

Using a procedure analogous to that described in Example 2, 1-(α-phenyl-ethyl)-4-phenyl-4-dimethylamino-piperidine, B.P. 173–179° C. at 0.5 mm. Hg, was prepared from 1-(α-phenyl-ethyl)-4-dimethylamino-4-cyano-piperidine and phenyl-magnesium-bromide. The hydrochloride had a melting point of 195–196° C.

EXAMPLE 99

Using a procedure analogous to that described in Example 2, 1-(α-phenyl-ethyl)-4-(p-methoxy-phenyl)-4-dimethylamino-piperidine, B.P. 190–195° C. at 0.4 mm. Hg, of the formula

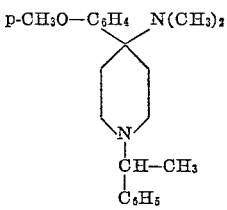

was prepared from 1-(α-phenyl-ethyl)-4-dimethylamino-4-cyano-piperidine and (p-methoxy-phenyl)-magnesium-bromide. The hydrochloride had a melting point of 205–206° C.

EXAMPLE 100

Using a procedure analogous to that described in Example 2, 1-(β-phenoxy-ethyl)-4-phenyl-4-dimethylamino-piperidine, M.P. 96–97° C., of the formula

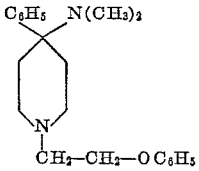

was prepared from 1-(β-phenoxy-ethyl)-4-dimethylamino-4-cyano-piperidine and phenyl-magnesium-bromide. The hydrochloride had a melting point of 224–225° C.

EXAMPLE 101

Using a procedure analogous to that described in Example 2, 1-(γ-phenyl-n-propyl)-4-ethyl-4-morpholino-piperidine, B.P. 149° C. at 0.03 mm. Hg, of the formula

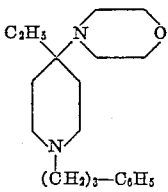

was prepared from 1-(γ-phenyl-n-propyl)-4-morpholino-4-cyano-piperidine and ethyl-magnesium-bromide.

EXAMPLE 102

Using a procedure analogous to that described in Example 2, 1-(γ-phenyl-n-propyl)-4-phenyl-4-dimethylamino-piperidine, B.P. 183–185° C. at 0.3 mm. Hg, was prepared from 1-(α-phenyl-n-propyl)-4-dimethylamino-4-cyano-piperidine and phenyl-magnesium-bromide. The hydrochloride had a melting point of 228–229° C.

EXAMPLE 103

Using a procedure analogous to that described in Example 2, 1-(γ-phenyl-n-propyl)-4-phenyl-4-morpholino-piperidine, M.P. 121–122° C., was prepared from 1-(γ-phenyl-n-propyl)-4-morpholino-4-cyano-piperidine and phenyl-magnesium-bromide.

EXAMPLE 104

Using a procedure analogous to that described in Example 2, 1-(β-phenyl-n-propyl)-4-phenyl-4-dimethylamino-piperidine, B.P. 179–182° C. at 0.4 mm. Hg, of the formula

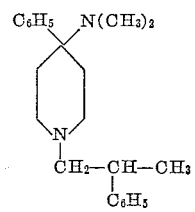

was prepared from 1-(β-phenyl-n-propyl)-4-dimethylamino-4-cyano-piperidine and phenyl-magnesium-bromide. The hydrochloride had a melting point of 232–233° C.

EXAMPLE 105

Using a procedure analogous to that described in Example 2, 1-(α-methyl-β-ethyl)-4-phenyl-4-dimethylamino-piperidine, B.P. 172–175° C. at 0.1 mm. Hg, of the formula

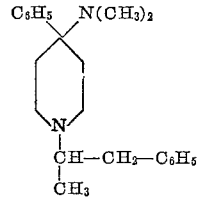

was prepared from 1-(α-methyl-β-phenyl-ethyl)-4-dimethylamino-4-cyano-piperidine and phenyl-magnesium-bromide. The hydrochloride had a melting point of 235–236° C.

EXAMPLE 106

Using a procedure analogous to that described in Example, 2, 1-(γ-phenyl-allyl)-4-phenyl-4-dimethylamino-piperidine, B.P. 190–195° C. at 0.5 mm. Hg, of the formula

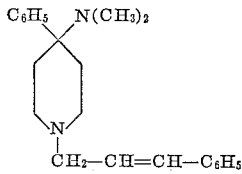

was prepared from 1-(γ-phenyl-allyl)-4-dimethylamino-4-cyano-piperidine and phenyl-magnesium-bromide. The hydrochloride had a melting point of 191–192° C.

EXAMPLE 107

Using a procedure analogous to that described in Example 2, 1-(α-methyl-γ-phenyl-n-propyl)-4-ethyl-4-morpholino-piperidine, B.P. 161–162° C. at 0.07 mm. Hg, of the formula

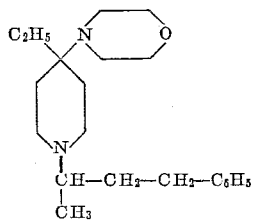

was prepared from 1-(α-methyl-γ-phenyl-n-propyl)-4-morpholino-4-cyano-piperidine and ethyl-magnesium-bromide.

EXAMPLE 108

Using a procedure analogous to that described in Example 2, 1-(α-methyl-γ-phenyl-n-propyl)-4-phenyl-4-morpholino-piperidine, B.P. 208–209° C. at 0.09 mm. Hg, was prepared from 1-(α-methyl-γ-phenyl-n-propyl)-4-morpholino-4-cyano-piperidine and phenyl-magnesium-bromide.

EXAMPLE 109

Using a procedure analogous to that described in Example 2, 1-n-hexyl-4-phenyl-4-morpholino-piperidine, M.P. 42–54° C., was prepared from 1-n-hexyl-4-morpholino-4-cyano-piperidine and phenyl-magnesium-bromide.

EXAMPLE 110

Using a procedure analogous to that described in Example 2, 1-allyl-4-methyl-4-morpholino-piperidine, B.P. 151–152° C. at 10 mm. Hg, M.P. 30° C., was prepared from 1-allyl-4-morpholino-4-cyano-piperidine and methyl-magnesium-bromide.

EXAMPLE 111

Using a procedure analogous to that described in Example 2, 1-allyl-4-n-propyl-4-morpholino-piperidine, B.P. 173° C. at 10 mm. Hg, was prepared from 1-allyl-4-morpholino-4-cyano-piperidine and n-propyl-magnesium-bromide.

EXAMPLE 112

Using a procedure analogous to that described in Example 2, 1-allyl-4-n-octyl-4-morpholino-piperidine, B.P. 152–154° C. at 0.13 mm. Hg, was prepared from 1-allyl-4-morpholino-4-cyano-piperidine and n-octyl-magnesium-bromide.

EXAMPLE 113

Using a procedure analogous to that described in Example 2, 1-allyl-4-benzyl-4-morpholino-piperidine, M.P. 72–73° C., was prepared from 1-allyl-4-morpholino-4-cyano-piperidine and benzyl-magnesuim-bromide.

EXAMPLE 114

Using a procedure analogous to that described in Example 2, 1-benzyl-4-methyl-4-morpholino-piperidine, M.P. 44–45° C., was prepared from 1-benzyl-4-morpholino-4-cyano-piperidine and methyl-magnesium-bromide.

EXAMPLE 115

Using a procedure analogous to that described in Example 1, 1-benzyl-4-n-hexyl-4-morpholino-piperidine, B.P. 175–176° C. at 0.03 mm. Hg, was prepared from 1-benzyl-4-morpholino-4-cyano-piperidine and n-hexyl-magnesium-bromide.

EXAMPLE 116

Using a procedure analogous to that described in Example 1, 1-benzyl-4-n-heptyl-4-morpholino-piperidine, B.P. 180–182° C. at 0.05 mm. Hg, was prepared from 1-benzyl-4-morpholino-4-cyano-piperidine and n-heptyl-magnesium-bromide.

EXAMPLE 117

Using a procedure analogous to that described in Example 2, 1-benzyl-4-n-octyl-4-morpholino-piperidine, B.P. 194–196° C. at 0.07 mm. Hg, was prepared from 1-benzyl-4-morpholino-4-cyano-piperidine and n-octyl-magnesium-bromide.

EXAMPLE 118

Using a procedure analogous to that described in Example 1, 1-benzyl-4-(β-phenyl-ethyl)-4-morpholino-piperidine, M.P. 102–103° C., was prepared from 1-benzyl-4-morpholino-4-cyano-piperidine and (β-phenyl-ethyl)-magnesuim-bromide.

EXAMPLE 119

Using a procedure analogous to that described in Example 2, 1-(β-phenyl-ethyl)-4-methyl-4-morpholino-piperidine, M.P. 95–96° C., was prepared from 1-(β-phenyl-ethyl)-4-morpholino-4-cyano-piperidine and methyl-magnesium-bromide.

EXAMPLE 120

Using a procedure analogous to that described in Example 1, 1-(β-phenyl-ethyl)-4-(p-methyl-phenyl)-4-morpholino-piperidine, M.P. 154–155° C., was prepared from 1-(β-phenyl-ethyl)-4-morpholino-4-cyano-piperidine and p-tolyl-magnesium-bromide.

EXAMPLE 121

Using a procedure analogous to that described in Example 1, 1-(β-phenyl-ethyl)-4-(p-methoxy-phenyl)-4-morpholino-piperidine, M.P. 129–130° C., was prepared from 1-(β-phenyl-ethyl)-4-morpholino-4-cyano-piperidine and (p-methoxy-phenyl)-magnesium-bromide.

EXAMPLE 122

Using a procedure analogous to that described in Example 2, 1-(β-phenyl-ethyl)-4-(o-methoxy-phenyl)-4-morpholino-piperidine, M.P. 137–138° C., was prepared from 1-(β-phenyl-ethyl)-4-morpholino-4-cyano-piperidine and (o-methoxy-phenyl)-magnesium-bromide.

EXAMPLE 123

Using a procedure analogous to that described in Example 2, 1-(β-phenyl-ethyl)-4-(p-chloro-phenyl)-4-morpholino-piperidine, M.P. 150–151° C., was prepared from 1-(β-phenyl-ethyl)-4-morpholino-4-cyano-piperidine and (p-chloro-phenyl)-magnesium-bromide.

EXAMPLE 124

Using a procedure analogous to that described in Example 2, 1-(γ-phenyl-n-propyl)-4-methyl-4-morpholino-piperidine, B.P. 162–163° C. at 0.03 mm. Hg, was prepared from 1-(γ-phenyl-n-propyl)-4-morpholino-4-cyano-piperidine and methyl-magnesium-bromide.

EXAMPLE 125

Using a procedure analogous to that described in Example 2, 1-(γ-phenyl-n-propyl)-4-benzyl-4-morpholino-piperidine, B.P. 223–224° C. at 0.12 mm. Hg, was prepared from 1-(γ-phenyl-n-propyl)-4-morpholino-4-cyano-piperidine and benzyl-magnesium-bromide.

EXAMPLE 126

Using a procedure analogous to that described in Example 2, 1-(β-phenoxy-ethyl)-4-methyl-4-morpholino-piperidine, M.P. 70–71° CC., of the formula.

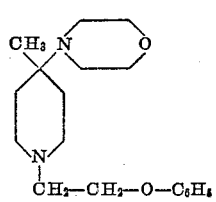

was prepared from 1-(β-phenoxy-ethyl)-4-morpholino-4-cyano-piperidine and methyl-magnesium-bromide.

EXAMPLE 127

Using a procedure analogous to that described in Example 2, 1-(β-phenoxy-ethyl)-4-ethyl-4-morpholino-piperidine, B.P. 167–169° C. at 0.06 mm. Hg, was prepared from 1-(β-phenoxy-ethyl)-4-morpholino-4-cyano-piperidine and ethyl-magnesium-bromide.

EXAMPLE 128

Using a procedure analogous to that described in Example 2, 1-(β-phenoxy-ethyl)-4-n-propyl-4-morpholino-piperidine, B.P. 180–182° C. at 0.07 mm. Hg, was prepared from 1(β-phenoxy-ethyl)-4-morpholino-4-cyano-piperidine and n-propyl-magnesium-bromide.

EXAMPLE 129

Using a procedure analogous to that described in Example 2, 1-(β-phenoxy-ethyl)-4-n-butyl-4-morpholino-piperidine, B.P. 183–184° C. at 0.07 mm. Hg, was prepared from 1-(β-phenoxy-ethyl)-4-morpholino-4-cyano-piperidine and n-butyl-magnesium-bromide.

EXAMPLE 130

Using a procedure analogous to that described in Example 2, 1-(β-phenoxy-ethyl)-4-n-hexyl-4-morpholino-piperidine, B.P. 198–200° C. at 0.09 mm. Hg, was prepared from 1-(β-phenoxy-ethyl)-4-morpholino-4-cyano-piperidine and n-hexyl-magnesium-bromide.

EXAMPLE 131

Using a procedure analogous to that described in Example 2, 1-(β-phenoxy-ethyl)-4-phenyl-4-morpholino-piperidine, M.P. 101–102° C., was prepared from 1-(β-phenoxy-ethyl)-4-morpholino-4-cyano-piperidine and phenyl-magnesium-bromide.

EXAMPLE 132

Using a procedure analogous to that described in Example 2, 1,4-dibenzyl-4-dimethylamino-piperidine, M.P. 98–100° C., was prepared from 1-benzyl-4-dimethylamino-4-cyano-piperidine and benzyl-magnesium-bromide.

EXAMPLE 133

Using a procedure analogous to that described in Example 2, 1-ethyl-4-(β-phenyl-ethyl)-4-morpholino-piperidine, B.P. 135° C. at 0.008 mm. Hg, was prepared from 1-ethyl-4-morpholino-4-cyano-piperidine and (β-phenyl-ethyl)-magnesium-bromide.

EXAMPLE 134

Using a procedure analogous to that described in Example 2, 1-n-propyl-4-(β-phenyl-ethyl)-4-morpholino-piperidine, B.P. 158° C. at 0.02 mm. Hg, was prepared from 1-n-propyl-4-morpholino-4-cyano-piperidine and (β-phenyl-ethyl)-magnesium-bromide.

EXAMPLE 135

Using a procedure analogous to that described in Example 2, 1-isopropyl-4-(β-phenyl-ethyl)-4-morpholino- piperidine, B.P. 152° C. at 0.008 mm. Hg, was prepared from 1-isopropyl-4-morpholino-4-cyano-piperidine and (β-phenyl-ethyl)-magnesium-bromide.

EXAMPLE 136

Using a procedure analogous to that described in Example 2, 1 - allyl - 4-(β-phenyl-ethyl)-4-morpholino-piperidine, B.P. 147° C. at 0.02 mm. Hg, was prepared from 1-allyl - 4 - morpholino-4-cyano-piperidine and (β-phenyl-ethyl)-magnesium-bromide.

EXAMPLE 137

Using a procedure analogous to that described in Example 2, 1-n-butyl-4-(β-phenyl-ethyl)-4-morpholino-piperidine, B.P. 173° C. at 0.08 mm. Hg, was prepared from 1-n-butyl-4-morpholino-4-cyano-piperidine and (β-phenyl-ethyl)-magnesium-bromide.

EXAMPLE 138

Using a procedure analogous to that described in Example 2, 1-(β-phenyl-ethyl)-4-(2'-thienyl)-4-morpholino-piperidine, M. P. 171–172° C., of the formula

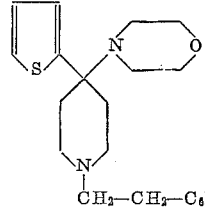

was prepared from 1 - (β - phenyl-ethyl)-4-morpholino-4-cyano-piperidine and 2-thienyl-magnesium-bromide.

EXAMPLE 139

Using a procedure analogous to that described in Example 2, 1 - (γ - phenyl-n-propyl)-4-(β-phenyl-ethyl)-4-morpholino-piperidine, B.P. 210° C. at 0.08 mm. Hg, was prepared from 1 - (γ - phenyl-n-propyl)-4-morpholino-4-cyano-piperidine and (β-phenyl-ethyl)-magnesium-bromide.

EXAMPLE 140

Using a procedure analogous to that described in Example 2, 1-(α-phenyl-ethyl)-4-ethyl-4-morpholino-piperidine, B.P. 137° C. at 0.008 mm. Hg, was prepared from 1-(α-phenyl-ethyl)-4-morpholino-4-cyano - piperidine and ethyl-magnesium-bromide.

EXAMPLE 141

Using a procedure analogous to that described in Example 2, 1-(α-phenyl-ethyl)-4-(β-phenyl-ethyl)-4-morpholino-piperidine, B.P. 219° C. at 0.005 mm. Hg, was prepared from 1-(α-phenyl-ethyl)-4-morpholino-4-cyano-piperidine and (β-phenyl-ethyl)-magnesium-bromide.

EXAMPLE 142

Using a procedure analogous to that described in Example 2, 1-(β-phenoxy-ethyl)-4-n-amyl-4-morpholino-piperidine, B.P. 167° C. at 0.005 mm. Hg, of the formula

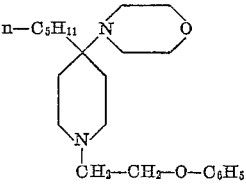

was prepared from 1 - (β - phenoxy-ethyl)-4-morpholino-4-cyanopiperidine and n-amyl-magnesium-bromide.

EXAMPLE 143

Using a procedure analogous to that described in Example 2, 1 - (β - phenoxy-ethyl)-4-n-heptyl-4-morpholino-piperidine, B.P. 181° C. at 0.005 mm. Hg, was prepared from 1 - (β-phenoxy-ethyl)-4-morpholino-4-cyano-piperidine and n-heptyl-magnesium-bromide.

EXAMPLE 144

Using a procedure analogous to that described in Example 2, 1 - (β-phenoxy-ethyl)-4-n-octyl-4-morpholino-piperidine, B.P. 202° C. at 0.01 mm. Hg, was prepared from 1 - (β-phenoxy-ethyl)-4-morpholino-4-cyano-piperidine and n-octyl-magnesium-bromide.

EXAMPLE 145

Using a procedure analogous to that described in Example 2, 1 - (β-phenoxy-ethyl)-4-n-decyl-4-morpholino-piperidine, B.P. 206° C. at 0.02 mm. Hg, was prepared from 1 - (β-phenoxy-ethyl)-4-morpholino-4-cyano-piperidine and n-decyl-magnesium-bromide.

EXAMPLE 146

Using a procedure analogous to that described in Example 2, 1 - (β - phenoxy-ethyl)-4-n-dodecyl-4-morpholino-piperidine, B.P. 231° C. at 0.07 mm. Hg, was prepared from 1-(β-phenoxy-ethyl)-4-morpholino-4-cyano-piperidine and n-dodecyl-magnesium-bromide.

EXAMPLE 146a

Using a procedure analogous to that described in Example 2, 1 - allyl - 4 - phenyl - 4-morpholino-piperidine, M.P. 70–71° C., was prepared from 1-allyl-4-morpholino-4-cyano-piperidine and phenyl-magnesium-bromide.

EXAMPLE 146b

Using a procedure analogous to that described in Example 2, 1 - benzyl - 4 - ethyl - 4 - morpholino-piperidine, B.P. 142–144° C. at 0.008 mm. Hg, was prepared from 1-benzyl-4-morpholino-4-cyano-piperidine and ethyl-magnesium-bromide. The hydrochloride had a melting point of 162–164° C.

EXAMPLE 146c

Using a procedure analogous to that described in Example 2, 1-benzyl-4-ethyl-4-piperidino-piperidine, B.P. 132–133° C. at 0.02 mm. Hg, was prepared from 1-benzyl-4-piperidino-4-cyano-piperidine and ethyl-magnesium-bromide. The hydrochloride had a melting point of 189–191° C.

EXAMPLE 146d

Using a procedure analogous to that described in Example 2, 1-(α-phenyl - ethyl)-4-phenyl-4-morpholino-piperidine, M.P. 119–120° C., was prepared from 1-(α-phenyl-ethyl)-4-morpholino-4-cyano-piperidine and phenyl-magnesium-bromide.

EXAMPLE 147

Using a procedure analogous to that described in Example 2, 1 - (β-phenoxy-ethyl)-4-(β-phenyl-ethyl)-4-morpholino-piperidine, B.P. 208° C. at 0.05 mm. Hg, was prepared from 1-(β-phenoxy-ethyl)-4-morpholino-4-cyano-piperidine and (β-phenyl-ethyl)-magnesium-bromide.

The compounds according to the present invention, that is, those embraced by Formula I and their non-toxic, pharmacologically acceptable acid addition salts, have useful pharmacodynamic properties. More particularly, they exhibit analgesic, spasmolytic, cardiovascular (coronary dilating), sedative and anti-tussive activities.

Examples of non-toxic, pharmacologically acceptable acid addition salts are those formed with one or two molar equivalents of the following inorganic and organic acids: hydrochloric acid, hydrobromic acid, sulfuric acid, phosphoric acid, nitric acid, acetic acid, propionic acid, butyric acid, valeric acid, oxalic acid, malonic acid, succinic acid, maleic acid, fumaric acid, lactic acid, tartaric acid, citric acid, malic acid, benzoic acid, phthalic acid, cinnamic acid, salicylic acid, nicotinic acid, 2-furoic acid, 8-chloro-theophylline and the like.

For therapeutic purposes, the compounds are administered by the peroral, parenteral or rectal route, preferably as active ingredients in customary dosage unit compositions, that is, compositions consisting essentially of an inert, physiologically compatible carrier and one dosage unit of the active ingredient, such as tablets, coated pills, solutions, suspensions and suppositories. One dosage unit of the compounds according to the present invention is from 10 to 100 mgm., and the daily dosage is from 20 to 300 mgm.

The following examples illustrate a few dosage unit compositions comprising one of the compounds of the present invention as an active ingredient. The parts are parts by weight unless otherwise specified.

EXAMPLE 148

TABLETS

The tablet composition is compounded from the following ingredients:

| | Parts |
|---|---|
| 1 - benzyl - 4 - (β - phenylethyl) - 4 - morpholino-piperidine | 20.0 |
| Lactose | 60.0 |
| Corn starch | 32.0 |
| Gelatin | 3.0 |
| Talcum | 4.0 |
| Magnesium stearate | 1.0 |
| Total | 120.0 |

*Compounding procedure.*—The piperidine compound, the lactose and the corn starch are thoroughly admixed with each other, the mixture is moistened with an aqueous 10% solution of the gelatin, and the moist mass is passed through a 1.0 mm.-mesh screen. The resulting granulate is dried at 40° C., the dry granulate is again passed through the 1 mm.-mesh screen and is then admixed with the talcum and the magnesium stearate. The resulting mixture is pressed into 120 mgm. tablets. Each tablet contains 20.0 mgm. of the active ingredient.

EXAMPLE 149

HYPODERMIC SOLUTION

The solution is compounded from the following ingredients:

| | | |
|---|---|---|
| 1 - (β - phenylethyl) - 4 - ethyl - 4 - morpholino-piperdine | parts | 75.0 |
| Tartaric acid | parts | 37.5 |
| Double-distilled water, q.s. ad | by vol. | 2000.0 |

*Compounding procedure.*—The tartaric acid and the piperidine compound are dissolved in about one-half of the required amount of the distilled water while heating the water to 80° C. Thereafter, the solution is allowed to cool to room temperature and the remainder of the distilled water is added. The finished solution is filtered until free from suspended particles and is then filled into 2 cc.-ampules. The filled ampules are sterilized at 120° C. for 20 minutes. Each ampule contains 75 mgm. of the active ingredient.

EXAMPLE 150

GELATIN CAPSULES

The contents of the capsules are compounded from the following ingredients:

| | Parts |
|---|---|
| 1 - (β - phenylethyl) - 4 - ethyl - 4 - morpholino-piperidine | 50.0 |
| Dry potato starch | 100.0 |
| Total | 150.0 |

*Compounding procedure.*—The piperidine compound and the potato starch are intimately admixed with each other, the resulting mixture is passed through a 0.75 mm.-mesh screen, and 150 mgm. portions of the screened composition are filled into gelatin capsules of suitable size. Each capsule contains 50 mgm. of the active ingredient.

EXAMPLE 151

SUPPOSITORIES

The suppository composition is compounded from the following ingredients:

| | Parts |
|---|---|
| 1 - (β - phenoxy - ethyl) - 4 - phenyl - 4 - morpholino-piperidine | 100.0 |
| Cocoa butter | 1600.0 |
| Total | 1700.0 |

*Compounding procedure.*—The cocoa butter is melted and then cooled to 37° C. The finely powdered piperidine compound is stirred into the warm cocoa butter with the aid of a homogenizer. The mixture is then poured into cooled suppository molds, each holding 1700 mgm. of the mixture. Each suppository contains 100 mgm. of the active ingredient.

EXAMPLE 152

COATED PILLS

The pill cores are compounded from the following ingredients:

| | Parts |
|---|---|
| 1 - benzyl - 4 - phenyl - 4 - pyrrolidino - piperidine | 40.0 |
| Lactose | 44.0 |
| Dry potato starch | 20.0 |
| Polyvinylpyrrolidone | 5.0 |
| Undried potato starch | 10.0 |
| Magnesium stearate | 1.0 |
| Total | 120.0 |

*Compounding procedure.*—The piperidine compound, the lactose, the dry potato starch and the polyvinylpyrrolidone are intimately admixed with each other, the mixture is moistened with distilled water (25 gm. per 1000 pill cores), the moist mass is granulated by passing it through a 1.0 mm.-mesh screen, and the granulate is dried at 40° C. The dry granulate is again passed through the 1.0 mm.-mesh screen and is then thoroughly admixed with the undried potato starch and the magnesium stearate. The finished mixture is pressed into 120 mgm. pill cores, which are then covered with a thin coating consisting essentially of talcum and sugar. The coated pills are then polished with beeswax. Each pill weighs about 200 mgm. and contains 40 mgm. of the active ingredient.

The above-described dosage unit compositions illustrate only a few selected compounds of the Formula I as active ingredients. It should be understood that any of the other piperdine derivatives embraced by Formula I or their non-toxic, pharmacologically acceptable acid addition salts may be substituted for the illustrated compounds in these dosage unit composition examples. Similarly, the amounts of the active ingredients in Examples 148 to 152 above may be varied within the dosage unit limits set forth above to meet particular requirements, as may the nature and quantities of the inert components in each case.

While the present invention has been illustrated with the aid of certain specific embodiments, it will be readily apparent to others skilled in the art that various changes and modifications may be made without departing from the spirit of the invention or the scope of the appended claims.

We claim:
1. A compound selected from the group consisting of 4-amino-piperidines of the formula

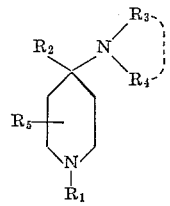

wherein
$R_1$ is selected from the group consisting of lower alkyl of more than one carbon atom, phenyl-lower alkyl, allyl, phenyl-allyl and phenoxy-lower alkyl,
$R_2$ is selected from the group consisting of alkyl of 1 to 12 carbon atoms, allyl, phenyl, chlorophenyl, lower alkoxy-phenyl, lower alkyl-phenyl, phenyl-lower alkyl, lower alkyl-phenyl-lower alkyl and thienyl-2,
$R_3$ and $R_4$ are each selected from the group consisting of lower alkyl, benzyl and, together with each other and the adjacent nitrogen atom, basic heterocycles selected from the group consisting of pyrrolidino, piperidino, morpholino and N'-methyl-piperazino, and
$R_5$ is lower alkyl,
and their non-toxic, pharmacologically acceptable acid addition salts.

2. 1-benzyl-4-phenyl-4-dimethylamino-piperidine.
3. 1-benzyl-4-n-hexyl-4-morpholino-piperidine.
4. 1 - benzyl - 4 - (β - phenyl - ethyl) - 4 - morpholino-piperidine.
5. 1 - (β - phenyl - ethyl) - 4 - phenyl - 4 - dimethylamino piperidine.
6. 1 - (β - phenyl - ethyl) - 4 - ethyl - 4 - morpholino-piperidine.
7. 1 - (β - phenyl - ethyl) - 4 - (thienyl - 2') - 4 - morpholino-piperidine.
8. 1 - (α - phenyl - ethyl) - 4 - (β - phenyl - ethyl)-4-morpholino-piperidine.
9. 1 - (β - phenoxy - ethyl) - 4 - n - pentyl - 4 - morpholino-piperidine.
10. 1 - (β - phenoxy - ethyl) 4 - n - hexyl - 4 - morpholino-piperidine.
11. 1 - (β - phenoxy - ethyl) - 4 - phenyl - 4-morpholino-piperidine.

References Cited by the Examiner

Chiavarelli et al.: Chemical Abstracts, vol. 52, p. 6340 (1958).

ALEX MAZEL, *Primary Examiner.*

J. TOVAR, *Assistant Examiner.*